(12) United States Patent
Wideman (10) Patent No.: US 9,176,978 B2
(45) Date of Patent: Nov. 3, 2015

(54) CLASSIFYING DATA FOR DEDUPLICATION AND STORAGE

(76) Inventor: Roderick B. Wideman, Shakopee, MN (US)

(*) Notice: Subject to any disclaimer, the term of this patent is extended or adjusted under 35 U.S.C. 154(b) by 912 days.

(21) Appl. No.: 12/366,563

(22) Filed: Feb. 5, 2009

(65) Prior Publication Data
US 2010/0198797 A1 Aug. 5, 2010

(51) Int. Cl.
*G06F 17/30* (2006.01)

(52) U.S. Cl.
CPC .............................. *G06F 17/30156* (2013.01)

(58) Field of Classification Search
CPC ..................... G06F 17/30159; G06F 17/30156
USPC .......................................................... 707/692
See application file for complete search history.

(56) References Cited

U.S. PATENT DOCUMENTS

| | | | | |
|---|---|---|---|---|
| 5,767,188 A * | 6/1998 | Kamikuri et al. | ............. | 524/507 |
| 5,774,563 A * | 6/1998 | DesLauriers et al. | ........... | 381/67 |
| 5,990,810 A * | 11/1999 | Williams | ........................ | 341/51 |
| 6,467,421 B1 * | 10/2002 | Conley | ........................ | 114/227 |
| 6,547,829 B1 * | 4/2003 | Meyerzon et al. | ............. | 715/234 |
| 7,092,956 B2 * | 8/2006 | Ruediger | ....................... | 707/602 |
| 7,200,604 B2 * | 4/2007 | Forman et al. | ................ | 707/692 |
| 7,415,445 B2 * | 8/2008 | Forman | ........................... | 706/20 |
| 7,519,635 B1 * | 4/2009 | Haustein et al. | ........ | 707/999.204 |
| 7,567,188 B1 * | 7/2009 | Anglin et al. | .................... | 341/63 |
| 7,814,074 B2 * | 10/2010 | Anglin et al. | ................. | 707/692 |
| 7,814,149 B1 * | 10/2010 | Stringham | ..................... | 709/203 |
| 8,055,618 B2 * | 11/2011 | Anglin | .......................... | 707/634 |
| 8,074,043 B1 * | 12/2011 | Zeis | .............................. | 711/171 |
| 8,315,985 B1 * | 11/2012 | Ohr et al. | ...................... | 707/664 |
| 2003/0097359 A1 * | 5/2003 | Ruediger | ............... | 707/999.006 |
| 2005/0097150 A1 * | 5/2005 | McKeon et al. | .............. | 707/202 |
| 2008/0155192 A1 | 6/2008 | Iitsuka | | |
| 2008/0288482 A1 * | 11/2008 | Chaudhuri et al. | .... | 707/999.005 |
| 2009/0182789 A1 * | 7/2009 | Sandorfi et al. | ............... | 707/204 |
| 2009/0204636 A1 * | 8/2009 | Li et al. | ..................... | 707/103 Y |
| 2010/0076934 A1 * | 3/2010 | Pershin et al. | ................. | 707/640 |

OTHER PUBLICATIONS

Athicha Muthitacharoen et al., "A Low-Bandwidth Network File System", 2001, ACM SOSP '01, pp. 174-187.*

Chuanyi Liu et al., "Admad: Application-Driven Metadata Aware De-Duplication Archival Storage System", 2008, IEEE SNAPI '08, pp. 29-35.*

Patent Cooperation Treaty (PCT), International Search Report and Written Opinion in co-pending PCT International Application No. PCT/US2010/022764 (Filing Date of Aug. 12, 2010), having a date of mailing of Sep. 3, 2010 (8 pgs).

* cited by examiner

*Primary Examiner* — Scott A Waldron (57) ABSTRACT

In a method of classifying data for deduplication, data to be classified is accessed. The data is classified into a deduplication classification in accordance with a data content aware data classification policy such that classified data is created. The data classification policy includes a plurality of deduplication classifications.

11 Claims, 7 Drawing Sheets

```
ACCESS DATA TO BE CLASSIFIED.
510
```

```
CLASSIFY THE DATA INTO A DEDUPLICATION CLASSIFICATION IN
ACCORDANCE WITH A DATA CONTENT AWARE DATA CLASSIFICATION
POLICY SUCH THAT CLASSIFIED DATA IS CREATED, WHEREIN THE
DATA CLASSIFICATION POLICY INCLUDES A PLURALITY OF
DEDUPLICATION CLASSIFICATIONS.
520
```

```
┌─────────────────────────────────────────────────────┐
│ RECEIVE CLASSIFIED DATA WHICH HAS BEEN CLASSIFIED INTO A │
│ DEDUPLICATION CLASSIFICATION IN ACCORDANCE WITH A DATA │
│ CONTENT AWARE DATA CLASSIFICATION POLICY, WHEREIN THE │
│  DATA CLASSIFICATION POLICY INCLUDES A PLURALITY OF │
│ DEDUPLICATION CLASSIFICATIONS INTO WHICH THE DATA CAN BE │
│                    CLASSIFIED.                      │
│                       610                           │
└─────────────────────────────────────────────────────┘
                         │
                         ▼
┌─────────────────────────────────────────────────────┐
│ PROCESS THE CLASSIFIED DATA WITHIN A DATA STORAGE SYSTEM │
│ FOR STORAGE IN THE DATA STORAGE SYSTEM IN ACCORDANCE WITH │
│      A DATA DEDUPLICATION STORAGE METHODOLOGY WHICH IS │
│ ASSOCIATED WITH THE DEDUPLICATION CLASSIFICATION INTO WHICH │
│           THE CLASSIFIED DATA IS CLASSIFIED.        │
│                       620                           │
└─────────────────────────────────────────────────────┘
                         │
                         ▼
┌─────────────────────────────────────────────────────┐
│     STORE, WITHIN THE DATA STORAGE SYSTEM, PROCESSED │
│        INFORMATION OUTPUT FROM THE PROCESSING.      │
│                       630                           │
└─────────────────────────────────────────────────────┘
```

CLASSIFYING DATA FOR DEDUPLICATION AND STORAGE

BACKGROUND

Data deduplication reduces the overall amount of data storage required to represent and retain data by identifying duplicate portions of the data and replacing those duplicate portions with pointers to existing copies of that data. Presently, solutions that provide data deduplication capability use a static and consistent method for all data that is processed, with no differentiation based on the data being deduplicated. As a result, various algorithm parameters used in deduplicating the data are established up front in an attempt to provide the best overall performance, in terms of metrics such as: data deduplication ratio: write throughput; read throughput; and resource consumption and overhead (e.g., CPU cycles, memory and disk capacity consumed/needed).

Presently, tradeoffs are necessitated in order to establish the parameters of a deduplication algorithm (such as average block size) or choice of the particular deduplication algorithm that is used. File-based deduplication (e.g., Single Instance Storage (SIS)) may be chosen to maximize throughput performance, minimize overhead, but sacrifice deduplication ratios. Block-based deduplication may be chosen to achieve better deduplication, but at the expense of throughput. Within block-based deduplication, fixed-length or variable-length methods may be used, and average lengths of greater or smaller size may be used, with each predetermined choice having additional tradeoff considerations (e.g., deduplication ratio vs. block size; indexing overhead; and long-term fragmentation effects, to name a few).

As but one example, a conventional deduplication solution might settle in advance on using a variable length block-based approach to deduplicating all data that is being stored in a data storage system, such as a virtual tape library or an automated storage system. Based on the chosen solution, all data will be processed in the exact same way with the same static parameters, with the output of all deduplication being stored in a single blockpool. A blockpool is a repository for storing a (typically) unique sequence of data known as a "block" that is referenced to find/replace redundant instances of the sequence. A block may be large, such as an entire file, or small such as a number of sequential bytes in a file or data stream. A sub-file sized portion of data is still a block, but may be referred to as a blocklet. The characteristics of this single blockpool are, likewise, determined in advance (often based upon tradeoffs) and remain static for all data that is processed. Some examples of these static characteristics include the mean block length, minimum block length, and maximum block length.

BRIEF DESCRIPTION OF THE DRAWINGS

The accompanying drawings, which are incorporated in and form a part of this specification, illustrate some embodiments of the subject matter and, together with the description, serve to explain principles discussed below.

The drawings referred to in this brief description should be understood as not being drawn to scale unless specifically noted.

DESCRIPTION OF EMBODIMENTS

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "accessing," "classifying," "receiving," "walking," "assigning," "associating," "storing," "processing," "retrieving," "deduplicating," "outputting," "varying," or the like, refer to the actions and processes of a computer system, microcontroller, processor, or similar electronic computing device. The computer system, microcontroller, processor, or similar electronic computing device manipulates and transforms data represented as physical (electronic) quantities within the computer system's/microcontroller's/processor's/similar electronic computing device's registers and memories into other data similarly represented as physical quantities within the memories or registers. In some embodiments such a computer system, microcontroller, processor, or similar electronic computing device is included within, coupled with, or takes the form a data storage system, a server, or both.

Overview of Discussion

Data deduplication often involves identifying duplicate data in a file, a data stream, or in a file system that is being stored or backed up to a data storage system, such as an automated storage system. Typically, a first instance of a data block (e.g., a file or blocklet of data, depending on the deduplication methodology employed) is placed in a blockpool as a reference copy of that data range. Depending on the deduplication process employed, duplications of reference data ranges are searched for in various forms, such as duplicated blocks/blocklets of data in a stream, duplicated blocklets of data in a file, or even duplicates of an entire file, to name a few. When a duplicated range of data is found in data being stored, a deduplicator replaces the identified duplicate data range with a smaller reference such as a pointer, code, dictionary count, or the like, that references a copy of the data range, pointer to a copy of the data range, or the like stored in a deduplication blockpool. In the case of a data stream, the deduplicated data stream is then stored. In the case of a file, the reference can be stored instead of storing the file. In this manner, deduplication typically allows more data to be stored in a fixed size data storage system than would otherwise be possible. When data is retrieved from deduplicated storage, the deduplication process is reversed to reassemble the data by substituting the stored reference copy of a data range for any reference to that data range.

Performing deduplication and retrieving data from deduplicated storage both take time and computing resources (processor cycles and storage overhead for a blockpool are but two examples). Numerous parameters can be manipulated to increase the speed of deduplication, increase the speed of retrieval, reduce the processor cycles needed, manage the size of the blockpool, and increase the deduplication ratio. Such parameters are preset and static in conventional storage systems that employ data deduplication, and therefore adjustments to such parameters are essentially design tradeoffs that are made in advance and permanently fixed. Deduplication is performed in a data agnostic manner, in accordance with the fixed parameters, on all data that is processed for deduplication. Thus, because the conventional deduplication process is unaware of the data content (e.g., file type, file metadata, data access requirements associated with particular data) it does not discriminate the data, but instead treats all data in the same fashion.

Herein, systems and methods are described for classifying data for a particular type of deduplication methodology based upon a content aware data classification policy. This content aware data classification is performed prior to or in conjunction with deduplication of data and allows, among other things, different deduplication methodologies to be applied to different classifications of data. Thus, instead of applying a one-size-fits-all monolithic approach to all data being stored, data is instead classified into two or more categories to which different deduplication methodologies are applied. As will be described herein, this data classification allows some customization, based upon data content, in the application of deduplication to data being stored and thus results in, among other things: an improved deduplication ratio (higher deduplication); greater deduplication speed, greater retrieval speed; and reduced overhead requirements.

Discussion will begin with description of an example storage system that deduplicates one or more electronic data files that have been classified for deduplication based upon a content aware data classification policy. An example data classifier that performs the classification of the data will be discussed. Some components of the storage systems will then be described in greater detail. A second embodiment of a data storage system will be described in which the data classifier and classification of the data are internal to the data storage system. Example data deduplication policies will then be discussed. Operation of the data classifier will then be described in more detail in conjunction with description of an example method of classifying data for deduplication. Operation of the example storage systems will then be described in greater detail in conjunction with description of an example method of storing data in a data storage system.

Example Storage System

Figure 1:
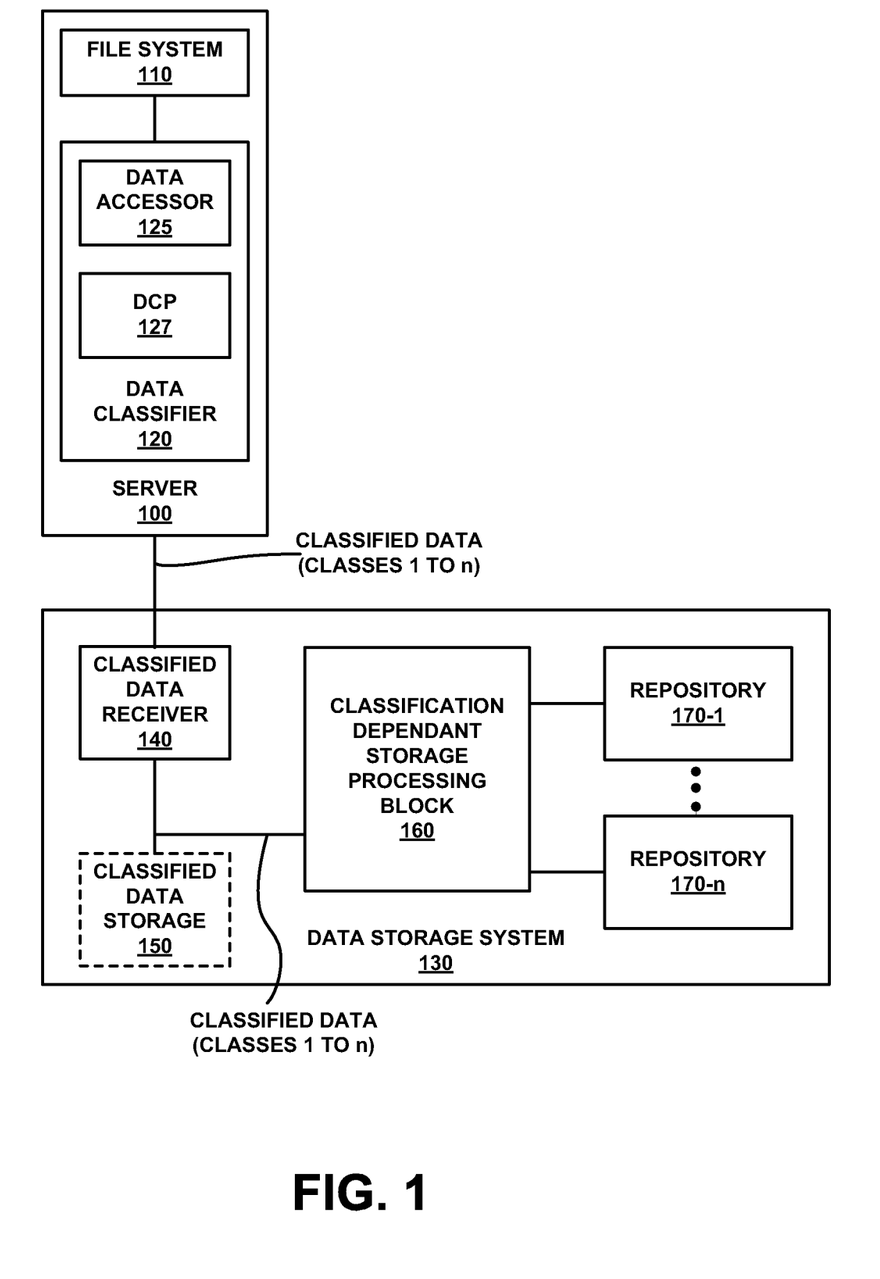
FIG. 1 is a block diagram of an example data storage system coupled with an example server, according to an embodiment.

FIG. 1 is a block diagram of an example data storage system 130 coupled with an example server 100, according to an embodiment. It is appreciated that the coupling to server 100 is for purposes of example and not limitation, and that data storage system 130 can exist apart from server 100 and can also be coupled to other devices and systems that classify data, provide data or access to data to be stored, or provide access to classified data.

As shown in FIG. 1, server 100 comprises a file system 110, and a data classifier 120. Server 100 can be any type of server that maintains or has access to a file system 110 wherein data is stored in the format of files. In one embodiment server 100 is, for example, a file server.

File system 110, can be any type of file system that stores data files. Such files may be maintained in a directory structure, or other structure. Files may be the files of a single user or a plurality of different users. Files may also be files of a plurality of a single file type or a plurality of file types. File system 110 can be implemented in a variety of manners. In various embodiments a file system 110 can be implemented on one or more disk drives, on a RAID (redundant array of independent disks), or as a virtual file system, among other implementations. It is appreciated that server 100 and file system 110 are shown as an example system in which data classifier 120 is implemented as an entity external to data storage system 130. To that end, server 100 can also represent a desktop computer system, or other type of computer system (such as computer system 700 of FIG. 7) that includes or has access to a file system 110 that stores data in the form of files.

Files stored in file system 110 each include a file type and descriptive metadata. A file type may be inferred in many instances from the extension associated with a file name. For example, a file name of "jayhawk.doc" has a file extension of ".doc" that indicates that the file type is a particular word processor file associated with a particular word processor application. It is appreciated that the file type is typically indicative of the application a file is associated with and dictates the structure and type of information in the file. Metadata is other descriptive information about a file and can be derived from many sources. Some sources include the file itself, or the location of the file. Some non-limiting examples of such metadata include: the date/time at which a file is stored, the frequency with which a file is accessed, the size of a file, the date a file was created, the date of last access of a file, the owner/user of a file, and the creator of a file.

As shown in FIG. 1, data classifier 120 is external to data storage system 130. In other embodiments, such as the embodiment of FIG. 4, it is appreciated that data classifier 120 is or can be integrated within a data storage system. In one embodiment, as shown, data classifier 120 includes or accesses a data classification policy (DCP) 127. Data classifier 120 classifies data, such as one or more electronic files of file system 110. This comprises classifying one or more of the files of file system 110 in accordance with a data content aware data classification policy, such as DCP 127. Data classification policies, such as DCP 127, are described in further detail below under a separate heading. A classified file is referred to herein as "classified data" and is created when data classifier 120 classifies a particular file into one of a plurality of deduplication classifications, or "classes" (e.g., class 1 . . . class n), that exist in a data classification policy, such as DCP 127, that data classifier 120 uses when performing the classifying. It is appreciated that, in some embodiments, data classifier 120 can classify data as a background or secondary operation.

In one embodiment, data classifier 120 places classified data (files that have been classified by data classifier 120) into appropriate intermediate storage in locations that are unique to each data classification class. This can comprise data classifier 120 or data accessor 125 creating an electronic folder or storage location, such as in file system 110, for each class (e.g., class 1 . . . class n) of a content aware data classification policy (e.g., DCP 127). In one embodiment, upon direction, data classifier 120 sends classified data to data storage system 130 for storage. This can comprise data classifier 120 sending the classified data directly to data storage system 130 or sending the classified data from an intermediate storage location in which it has been temporarily been stored prior to further processing. In one embodiment, data storage system 130 itself accesses the intermediate storage location(s) in which classified data has been stored following classification by data classifier 120.

In one embodiment, data classifier 120 includes data accessor 125. When included, data accessor 125 accesses electronic data files, such as files of file system 110, that data classifier 120 then classifies. In one embodiment, this comprises receiving files that may be sent one at a time or in a stream, such as from file system 110. In one embodiment this comprises data accessor 125 "walking" a file system to systematically identify and/or retrieve files within the file system to be classified by data classifier 120. For example, the walking can begin at a root directory and then proceed systematically through every sub-level of the root directory. In some embodiments, data accessor 125 only accesses or "walks" certain directories or folders (such as those containing or used for storing user data files). It is appreciated that this "walking" of files and classifying of files can be done in the background as a secondary operation of server 100. In some embodiments, the files and/or storage locations that are accessed by data accessor 125 are selected based upon input from a system administrator or other operator responsible for operations on server 100. In one embodiment, such as when data accessor 125 receives a data stream, data accessor 125 identifies one or more files within the data stream based on identifying header information, file metadata, or one or more other identifiers associated with the file(s). In this manner, data accessor 125 can identify all files in a data stream or can identify some subset of files of interest from the data stream (e.g., encrypted files, word processor files, and/or compressed audio files, among others).

As shown in FIG. 1, data storage system 130, comprises a classified data receiver 140, a classification dependant storage processing block 160, and a plurality of repositories 170-1 through 170-n for storing information. In one embodiment, data storage system 130 also includes classified data storage 150. In some embodiments, data storage system 130 is an automated storage system, such as a virtual tape library, a RAID (redundant array of independent disks), or a data center. By way of example, and not of limitation, in one embodiment, a DXi-Series disk backup and multi-site remote replication appliance, available from Quantum Corporation of San Jose, Calif., can be configured as data storage system 130.

Classified data receiver 140 receives classified data that has been classified by data classifier 120. This can comprise receiving classified data directly from data classifier 120. This can also comprise accessing and retrieving classified data from one or more intermediate storage locations in which classified data has been stored after being classified by data classifier 120. In one embodiment, classified data receiver 140 provides received classified data to classification dependant storage processing block 160. In one embodiment classified data receiver 140 provides received classified data to classified data storage 150.

Classified data storage 150 comprises one or more intermediate storage locations in which classified data can be stored prior to being processed by classification dependant storage processing block 160. In some embodiments, classified data storage 150 operates somewhat like a buffer to store classified data that may be received faster than it can be processed. In some embodiments classified data storage 150 accumulates a certain amount of data of a particular class before the data of that particular data classification is processed by classification dependant storage processing block 160.

Classification dependant storage processing block 160 processes classified data according to any of a predefined plurality of possible data deduplication storage methodologies that are associated with the data classification of the classified data. Consider an embodiment in which a data classification policy, such as DCP 127, has two classes: class 1 and class 2. In one such embodiment, class 1 is associated with a whole file deduplication (e.g., single instance storage) deduplication methodology and class 2 is associated with a sub-file blocklet level deduplication methodology. In such an embodiment, classification dependant storage processing block 160 processes data classified into class 1 in accordance with the whole file deduplication methodology and stores the first instance of a file in a repository (e.g., repository 170-1) that serves as or includes a blockpool for class 1 and then deduplicates recurring instances of the file by storing a code, pointer, or the like in place of repeated instances of the file. Likewise, in such an embodiment, classification dependant storage processing block 160 processes data classified into class 2 in accordance with the sub-file blocklet level methodology and stores the first instance of a blocklet in a repository (e.g., repository 170-n) that serves as or includes a blockpool for class 2 and then deduplicates recurring instances of the blocklet by storing a code, pointer, or the like in place of repeated instances of the blocklet.

In one embodiment, a repository 170 is utilized for storing processed information output from classification dependant storage processing block 160 for a single deduplication methodology. In one embodiment, a repository 170 comprises a blockpool and/or any other storage required for a deduplication methodology. In one embodiment, where the deduplication methodology, associated with a repository 170, is "storage without deduplication," a repository 170 is simply a storage area. Storage without deduplication can be utilized for various files, such as files that need to be accessed very quickly or files that are not amenable to other forms of deduplication. Repositories 170-1 through 170-n represent a plurality of methodology specific repositories for separately storing output from classification dependant storage processing block 160. The number of repositories (170-1 to 170-n) is dependant, in one embodiment, upon the number of the plurality of predefined different data deduplication storage methodologies employed within classification dependant storage processing block 160. In one embodiment, for example, there is one repository 170 for each of the plurality of predefined different data deduplication storage methodologies employed by classification dependant storage processing block 160.

Figure 2:
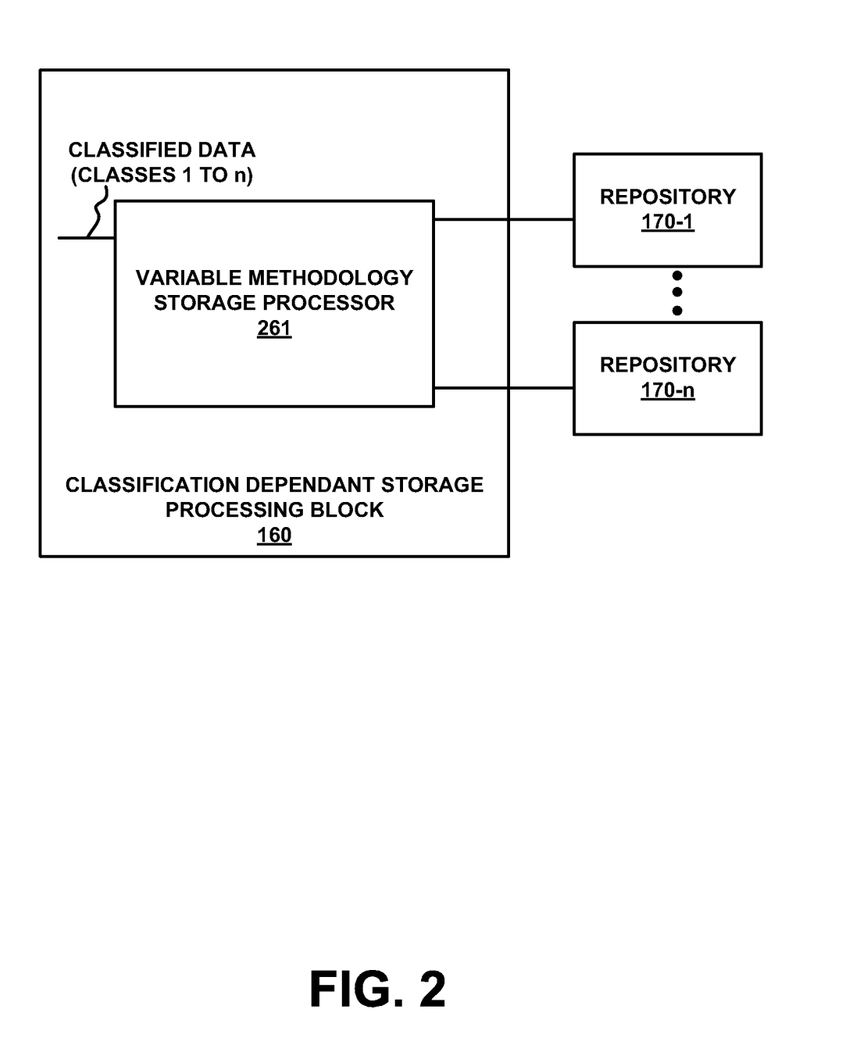
FIG. 2 is a block diagram of a first example of a classification dependant storage processing block, according to an embodiment.

FIG. 2 is a block diagram of a first example of a classification dependant storage processing block 160, according to an embodiment. As shown in FIG. 2, in one embodiment, classification dependant storage processing block 160 comprises a variable methodology storage processor 261 that varies its deduplication storage methodology and/or deduplicating parameters in accordance with the data classification (class) of the classified data that it is processing for storage. This can comprise variable methodology storage processor 261 varying among a plurality of predefined different data deduplication storage methodologies in order to process and store the classified data in accordance with the particular data duplication methodology that is associated with the class into which the classified data is classified. This can also comprise variable methodology storage processor 261 varying parameters that are applied to a particular deduplication methodology in accordance with the particularities of a deduplication methodology that is associated with the class into which the classified data is classified. Thus, in some embodiments, variable methodology storage processor 261 alters or adjusts one or more deduplication parameters such as average blocklet size, minimum blocklet size, maximum blocklet size, in accordance with the parameters assigned to a deduplication methodology with which a particular data classification is associated. As shown in FIG. 2, variable methodology storage processor 261 is coupled with a plurality of repositories 170-1 to 170-n, where each repository 170 is used for storing output of a different deduplication storage methodology employed by variable methodology storage processor 261.

Figure 3:
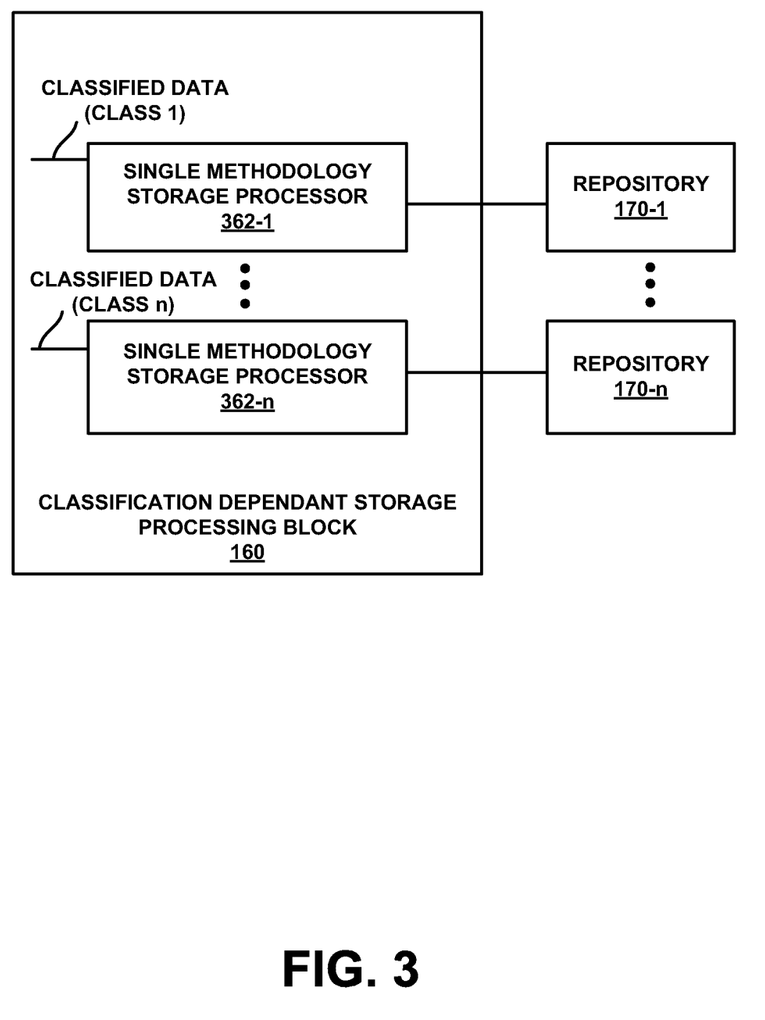
FIG. 3 is a block diagram of a second example of a classification dependant storage processing block, according to an embodiment.

FIG. 3 is a block diagram of a second example classification dependant storage processing block 160, according to an embodiment. As shown in FIG. 3, in one embodiment, classification dependant storage processing block 160 comprises a plurality of single methodology storage processors 362-1 to 362-n. Each storage processor 362 of the plurality processes classified data for deduplication in accordance with a different deduplication methodology of a plurality of predefined different data deduplication storage methodologies. Consider, for example, an embodiment where a first single methodology storage processor 362-1 processes and stores classified data in accordance with a first data deduplication storage methodology, such as whole file deduplication. In this same embodiment, a second single methodology storage processor 362-n processes and stores classified data in accordance with a second data deduplication storage methodology, such as sub-file blocklet level deduplication. In a similar fashion, additional storage processors 362 can be included to process classified data according to additional data deduplication storage methodologies. It is appreciated that in one embodiment, a classification dependant storage processing block can include one or more variable methodology storage processors 261 and one or more single methodology storage processors 362. As shown in FIG. 3, each single methodology storage processor 362-1 to 362-n is coupled with a single repository 170 of a plurality of repositories 170-1 to 170-n. In this manner, each repository 170 of the plurality of repositories 170-1 to 170-n is used for exclusively storing output of a deduplication storage methodology that is employed by the single methodology storage processor 362 to which it is coupled.

Figure 4:
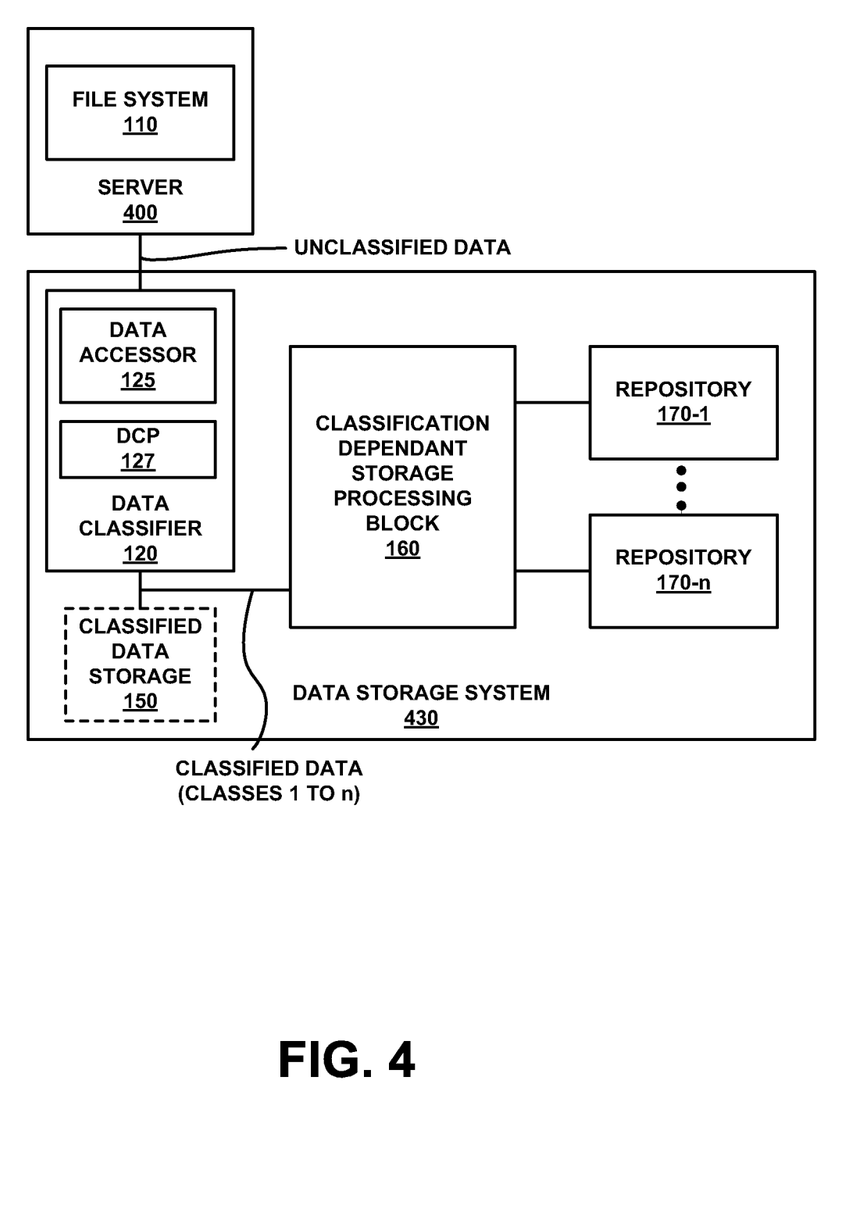
FIG. 4 is a block diagram of a second example data storage system coupled with a second example server, according to an embodiment.

FIG. 4 is a block diagram of a second example data storage system 430 coupled with a second example server 400, according to an embodiment. It is appreciated that items bearing common figure numbers are the same or similar to those described previously in FIGS. 1, 2, and 3. Server 400 is the same as server 100 except for the absence of data classifier 120 that is now included within data storage system 430. Data storage system 430 is the same as data storage system 130 except that classified data receiver 140 has been omitted due to the inclusion of data classifier 120 within data storage system 430. By way of example, and not of limitation, in one embodiment, a DXi-Series disk backup and multi-site remote replication appliance, available from Quantum Corporation of San Jose, Calif., can be configured as data storage system 430.

As shown in FIG. 4, data classifier 120 operates in the same manner as previously described by accessing or receiving data, such as in the form of electronic files, and then classifying the data into one of a plurality of classes. Data classifier 120 performs the classifying according to the predefined terms of a data classification policy, such as DCP 127, that is included in or accessed by data classifier 120. It is appreciated that data classifier 120 can utilize data accessor 125 to access or receive data for classification. As shown in the embodiment of FIG. 4, such data is accessed for classification, for example, from file system 110 of server 400. However, it is appreciated that data accessor 125, in some embodiments, accesses data for classification from other entities or locations besides the depicted server 400. In one embodiment, after data classifier 120 has classified a range of data, such as an electronic file, into a class of classes 1 to n, the classified data is provided to classification dependant storage processing block 160 for storage processing. In one embodiment, after data classifier 120 has classified a range of data, such as an electronic file, into a class of classes 1 to n the classified data is provided to classified data storage 150 for intermediate storage until it can be processed in the future for storage by classification dependant storage processing block 160.

It is appreciated that FIG. 4 illustrates one of many possible levels of integration of data classifier 120 into a data storage system, such as data storage system 430. In another embodiment, where data classifier 120 is more tightly integrated, data classifier 120 is incorporated as a part of classification dependant storage processing block 160, and performs data classification of data as a stage of processing the data for storage. This tighter integration involves configuring classification dependant storage processing block 160 to perform data classification, such as on-the-fly, as data is accessed (received or retrieved) for storage processing. This allows for storage in a content aware fashion on such bases as file type and file metadata, among others.

Consider an embodiment where a stream of data is received and processed by a tightly integrated data classifier 120 incorporated within classification dependant storage processing block 160. As the stream of data is being processed, data classifier 120 identities and locates the beginnings of files and in some embodiments associated file metadata, and then classifies the identified files. Depending upon the data classification policy employed, this can include identifying all files in a data stream or only a subset of certain files of particular interest with other unidentified data receiving a single classification. For example, in one embodiment, compressed audio files are identified and classified in to a class that is associated with whole file deduplication while all other data is classified into a class that is associated with sub-file blocklet level deduplication. In another example, in one embodiment, word processor files are identified and classified into a class that is associated with whole file deduplication; encrypted files are identified and classified into a class that is associated with storage with no deduplication processing; electronic mail archive files (e.g., "*.pst" files) are identified and classified into a class that is associated with sub-file small grain blocklet level deduplication; data accessed or created within the previous week is classified into a class that is associated with sub-file large grain blocklet level deduplication; and all other data is classified into a class that is associated with sub-file medium grain blocklet level deduplication. It is appreciated that such classification can also be accomplished by a data classifier 120 that is not tightly integrated into classification dependant storage processing block 160 (see embodiments depicted in FIG. 1 and FIG. 4).

Data Classification Policies

As described herein, a data classification policy employed by data classifier 120 will have at least two data classifications or "classes" into which data, such as an electronic file, can be classified. It is appreciated that some embodiments may include three or more classes. DCP 127 of FIGS. 1 and 4 is an example of a data classification policy. The data classification policy is set up in advance of classifying data and, in one embodiment, can be modified, such as in accordance with user preferences. In some embodiments, the data classification policy is stored in memory or storage within or accessible by data classifier 120. In some embodiments, the data classification policy is stored as instructions on a computer-readable storage medium.

Each different class of a data classification policy is associated, in advance, with a different deduplication storage methodology that is particularly suited for its class and the data that is classified into that class. Some examples of deduplication methodologies that may, in some embodiments, be associated with a class include: whole file (SIS) storage; sub-file blocklet level deduplication; and storage without deduplication processing. It is appreciated that other deduplication methodologies can be associated with classes, and that variations on these deduplication methodologies can be associated with classes.

With respect to sub-file blocklet level deduplication, several variations may be associated with different classes. By way of example, in various embodiments: a class can be associated with a large-grain block size (e.g., blocklets of 128K bytes, 256K bytes, or more); another class can be associated with medium grain block size (e.g., blocklets of 16K bytes, 32K bytes, 64K bytes, or some other size); and yet another class can be associated with small grain block size (e.g., 8K bytes, 4K bytes, or smaller). Other variations on grain size of blocks are possible. In one embodiment where two or more classes are each associated with a different granularity of sub-file blocklet size, the data classification policy is set up so that files are directed to a particular one of the sub-file blocklet classes based on the content of the data. In one embodiment, for example, a file that is more amenable to a small grain deduplication process will be classified into the class associated with a small grain block size deduplication methodology, while a file that is less amendable to a small grain deduplication process (but is still amenable to sub-file blocklet level deduplication) will be classified into the class associated with a large grain block size. In some embodiments, another characteristic (in addition to or instead of deduplication amenability) may be employed in the data classification policy to classify data into different classes that are associated with different blocklet grain sizes. For example, in one embodiment, files that need to be retrieved and reassembled faster or more often than other files are classified into the class associated with a large grain deduplication process (as large blocklets can be reassembled more quickly into a file), while all other files that are amenable to sub-file blocklet level deduplication are classified into a class associated with a small grain deduplication process.

Consider an embodiment in which a data classification policy has two classes. In one such embodiment, a first class is associated with a whole file deduplication (e.g., single instance storage) deduplication methodology, while a second class is associated with a sub-file blocklet level deduplication methodology. A file that is classified into the first class, in this particular two class embodiment, will be assigned to be deduplicated in accordance with this whole file deduplication methodology. For example, in one embodiment, word processor files and compressed audio files (e.g., "*.mp3" files) are assigned to the first class and are assigned to be deduplicated in accordance with the whole file de-duplication methodology. Likewise, a file that is associated with the second class, in this particular two class embodiment, will be assigned to be deduplicated in accordance with the particular sub-file blocklet level deduplication methodology that is associated with this second class. For example, in one embodiment, all other files that are not classified into the first class are classified, such as by default, into the second class and deduplicated with the sub-file blocklet level deduplication methodology.

Consider another embodiment in which a data classification policy has three classes. In one such embodiment, a first class is associated with a whole file deduplication (e.g., single instance storage) deduplication methodology, and a second class is associated with a methodology that involves simply storing the files without any deduplication processing, and a third class is associated with a sub-file blocklet level deduplication methodology. A file that is classified into the first class, in this particular three class embodiment, will be assigned to be deduplicated in accordance with this whole file deduplication methodology. In one embodiment, word processor files and compressed audio files (e.g., "*.mp3" files) are classified into this first class and are assigned to be deduplicated in accordance with the whole file de-duplication methodology. Likewise, a file that is classified into the second class, in this particular three class embodiment, will be assigned to be stored intact without being processed for deduplication or stored in a blockpool, in accordance with the file storage without deduplication processing methodology that is associated with this second class. In one embodiment, encrypted files and files belonging to the chief executive officer of a business are classified into this second class and are assigned to be stored intact without any processing for deduplication. In one embodiment, the encrypted files are classified into the second class because they are not very amenable to efficient whole file or blocklet deduplication, while the CEO's files are classified into the second class so that they can be retrieved more quickly from storage. Similarly, a file that is classified into the third class, in this particular three class embodiment, will be assigned to be deduplicated in accordance with the particular sub-file blocklet level deduplication methodology that is associated with this third class. In one embodiment, any file that is not classified into class 1 or class 2 is classified into class 3 and is assigned to be deduplicated in accordance with the sub-file blocklet level deduplication methodology.

Example Methods of Operation

Figure 5:
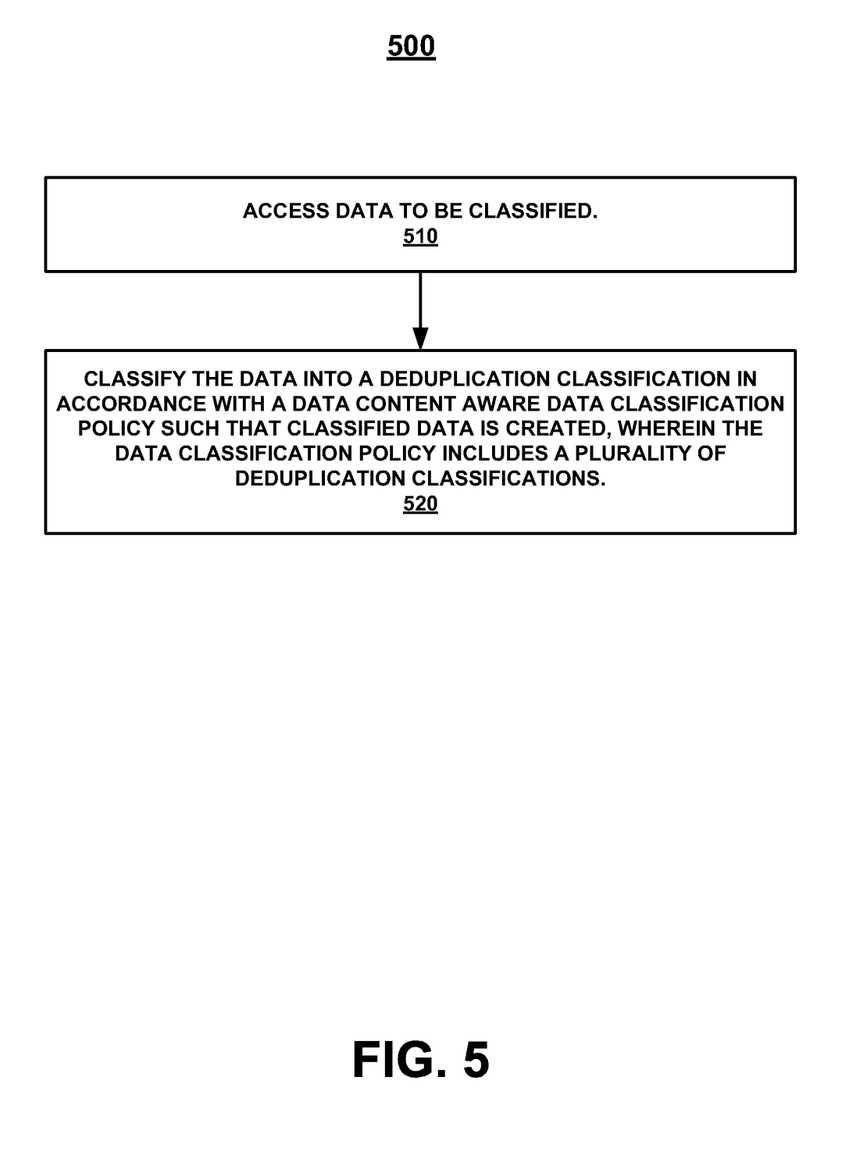
FIG. 5 illustrates a flow diagram of an example method of classifying data for deduplication, according to an embodiment.
Figure 6:
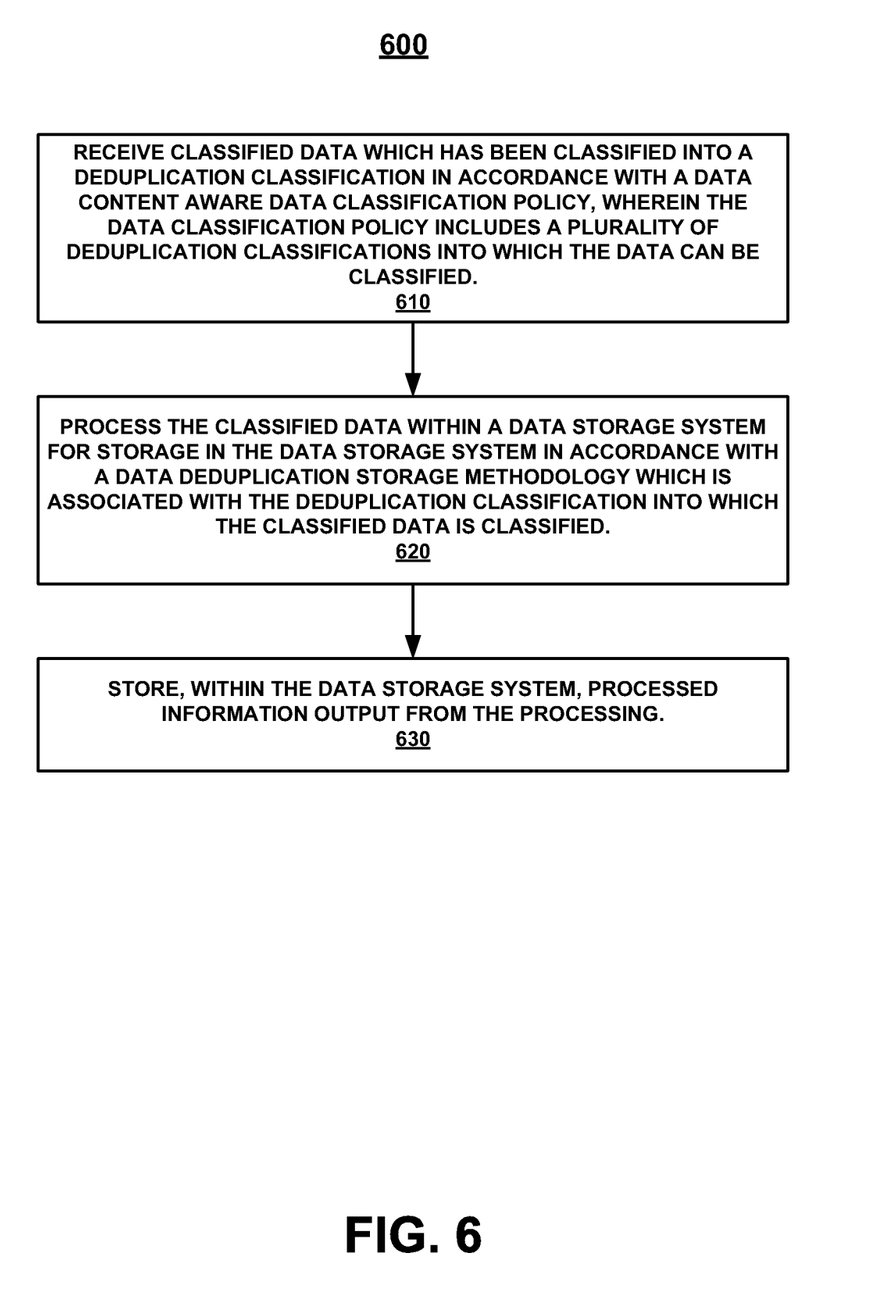
FIG. 6 illustrates a flow diagram of an example method of storing data, according to an embodiment.
Figure 7:
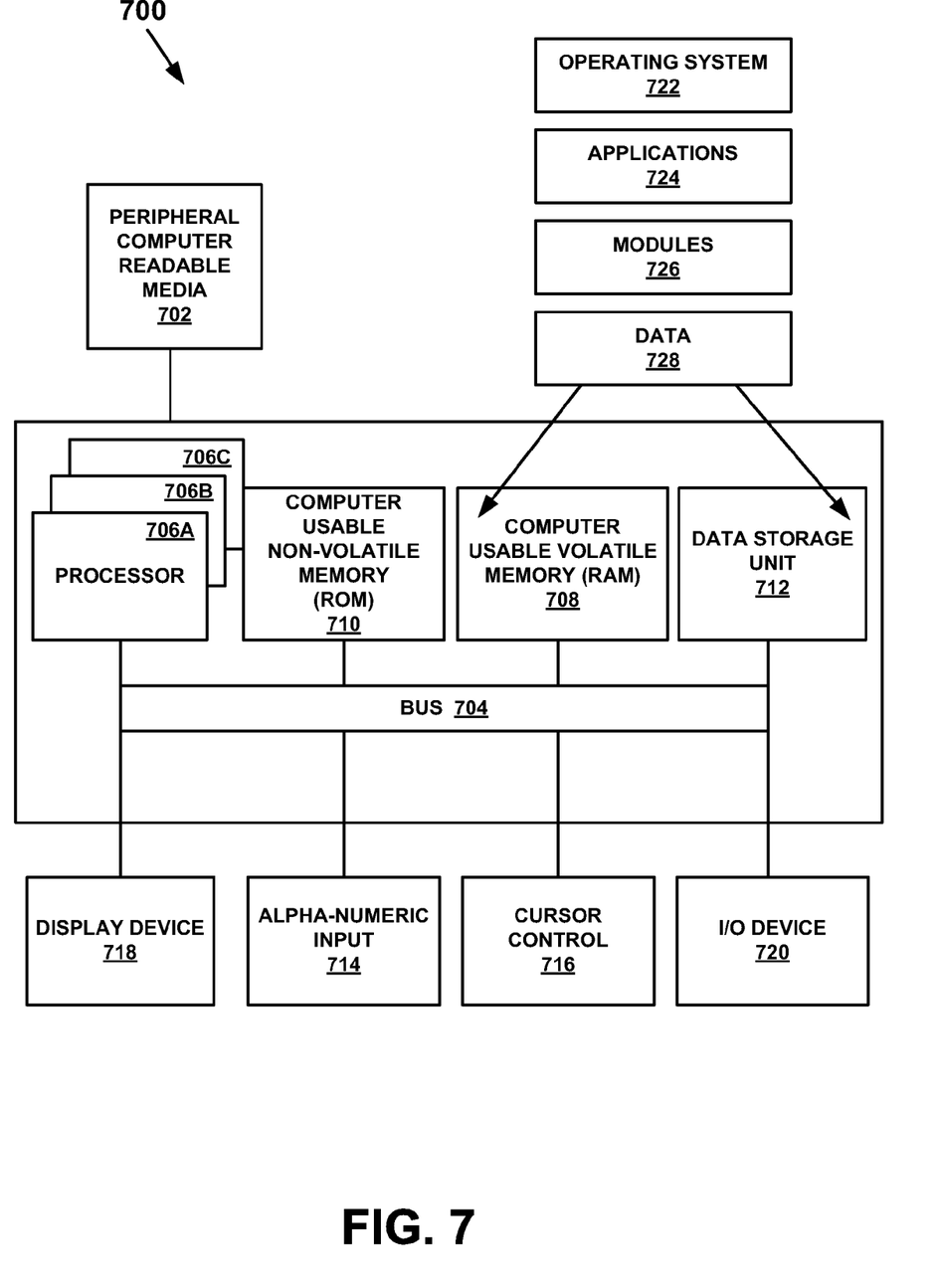
FIG. 7 illustrates an example computer system, according to an embodiment, with which or upon which various embodiments of the present invention can be implemented.

Flow diagrams 500 and 600 include processes that, in various embodiments, are carried out by a processor/microcontroller under the control of computer-readable and computer-executable instructions. In some embodiments, this comprises a processor/microcontroller that is in, or used to implement one or more functions of a storage system such as data storage system 130 or data storage system 430. In some embodiments, this includes a processor/microcontroller that is external to a data storage system, and located in a server such as server 100 or server 400 or is located in a stand alone computer system such as computer system 700 (FIG. 7). It is appreciated that the computer-readable and computer-executable instructions for executing the method illustrated by flow diagram 500 or the method illustrated by flow diagram 600 reside, for example, in any tangible computer-readable storage media. Some examples of suitable computer-readable storage media include, but are not limited to, a compact disk read only memory (CD-ROM), a read only memory, random access memory, and a magnetic storage media (e.g., a disk or a tape). In some embodiments such computer-readable and computer-executable instructions, reside on computer-readable storage media such as a ROM or firmware of a processor/microcontroller.

Although specific flows of procedures are disclosed in flow diagrams 500 and 600, such flows are provided for example. That is, embodiments are well suited to performing various other procedures or variations of the procedures recited in flow diagrams 500 and 600. It is appreciated that, in some embodiments, the procedures in flow diagrams 500 and 600 may be performed in different orders than presented, and that not all of the procedures in flow diagrams 500 and 600 may be performed in every embodiment.

Example Method of Classifying Data for Deduplication

FIG. 5 illustrates a flow diagram 500 of an example method of classifying data for deduplication, according to an embodiment. In one embodiment, the method of flow diagram 500 is implemented with a data classifier, such as data classifier 120, that is included in a server 100, 400 or a computer system 700 (see FIG. 7). Reference will be made to previously described elements of FIGS. 1-4 in the description of the method illustrated in flow diagram 500.

At 510 of flow diagram 500, in one embodiment, the method accesses data to be classified. In one embodiment, this comprises data classifier 120 accessing the data to be classified and can include accessing such data using data accessor 125. In various embodiments, this can include: receiving or retrieving such data in the form of individual files; receiving such data in the form of a data stream; walking a file system (such as file system 110) to access data in the form of files of the file system; or other access techniques. In one embodiment, where a file stream is received, data accessor 125 or another portion of data classifier 120 acts to monitor the file stream and identify the presence of one or more files based on information such as a file header associated with a particular type of file, metadata associated with a particular type of file, or other unique information or data known to provide a "fingerprint" for identifying a particular type or kind of file (e.g., a word processor file, an encrypted file, a compressed audio/video file, a file belonging to a particular user, among others).

At 520 of flow diagram 500, in one embodiment, the method classifies the accessed data into a deduplication classification. The classification is performed in accordance with a data content aware data classification policy that includes a plurality of deduplication classifications into which data can be classified. This classification creates "classified data." In one embodiment, this comprises data classifier 120 classifying the accessed data in accordance with DCP 127.

In one embodiment, the classifying comprises data classifier 120 classifying all or some portion of the accessed data into a deduplication classification in accordance with one or more classification parameters of a group of classification parameters that are included in DCP 127. Such classification parameters can include, among others: classification according to a file type of the data (e.g., an electronic mail archive file may receive one classification while a compressed audio file receives another classification); classification according to metadata associated with the accessed data (e.g., if metadata of a file indicates that one of two files was created three years ago while the other of the two files was created a day ago, they may receive different classifications); and classification based upon an access requirement associated with the data (e.g., if file metadata or other information such as administrator identification of a file indicates that one of two files belongs to the chief executive officer of a company, it may receive a different classification than the other of the two files so that it can be retrieved more quickly from storage within data storage system 130).

In one embodiment, the classifying performed at 520 of flow diagram 500 also comprises assigning the classified data to a data deduplication storage methodology. In one embodiment, this comprises data classifier 120 assigning a unit of classified data, such as a classified data file, to one of a plurality of predefined different data deduplication storage methodologies that has been pre-associated with the data classification into which the classified data is classified. Consider an embodiment that has two data classes, class 1 (associated with sub-file blocklet level deduplication) and class 2 (associated with storage without deduplication. In one such embodiment, data classifier 120 classifies an electronic mail archive file (e.g., a "*.pst" file) into class 1 and assigns the classified email archive file to be deduplicated in accordance with the associated with sub-file blocklet level deduplication that is associated with class 1. Similarly, in one such embodiment, data classifier 120 classifies an encrypted file into class 2 and assigns the classified encrypted file to be stored without being processed for deduplication accordance with the associated with the storage without deduplication methodology that is associated with class 2.

In one embodiment, the assigning can comprise data classifier 120 directing (such as forwarding or sending) the classified data to classification dependant storage processing block 160 with direction as to how the classified data is to be processed and stored in accordance with the particular data duplication storage methodology associated with the class into which the classified data has been classified. Among other direction, this can comprise identifying the class to classification dependant storage processing block 160, such as through a communication between data classifier 120 and classification dependant storage processing block 160 or data classifier 120 tagging the classified data with a class identification or deduplication instruction. Such direction can also comprise data classifier 120 routing the classified data to a single methodology storage processor that deduplicates according to the deduplication storage method assigned to the class into which the classified data is classified.

The direction can also involve storing classified data in an intermediate storage, such as classified data storage 150, for future processing in accordance with the data deduplication storage methodology that is associated with the classification of data. In one embodiment, this storage comprises storing each class of data (e.g., class 1, class 2, etc.) in a separate storage (e.g., a separate file or separate location for each class) such that the separate storage identifies the class of data stored therein and provides direction as to the deduplication mythology to be used in further processing the data through classification dependant storage processing block 160. Extrapolating on the above described two classification example, in one embodiment, a folder named "Class 1" is used to store data classified into class 1 and a folder named "Class 2" is used to store data classified into class 2.

Example Method of Storing Data in a Data Storage System

FIG. 6 illustrates a flow diagram 600 of an example method of storing data, according to an embodiment. In one embodiment, flow diagram 600 illustrates a method of storing data in a data storage system, such as an automated storage system. Data storage system 130 of FIG. 1 illustrates one example of a storage system that can implement the method of flow diagram 600. Data storage system 430 of FIG. 4 illustrates another example of a storage system that can implement the method of flow diagram 600. Reference will be made to previously described elements of FIGS. 1-4 in the description of the method illustrated in flow diagram 600.

At 610 of flow diagram 600, in one embodiment, the method receives classified data that has been classified into a deduplication classification. The classification of the data has been performed in accordance with a data content aware data classification policy, such as DCP 127. The data classification policy used for classifying the data includes a plurality of deduplication classifications into which the classified data can be classified. In one embodiment, 610 of flow diagram 600 comprises classified data receiver 140 of data storage system 130 receiving the classified data. In one embodiment classified data receiver 140 provides the received classified data to classified data storage 150 for intermediate storage until the classified data can be processed through classification dependant storage processing block 160. In one embodiment, classified data receiver 140 provides the received classified data to classification dependant storage processing block 160. It is appreciated that in some embodiments, classified data receiver 140, while represented in FIG. 1 as an independent entity, may actually be incorporated into (or as functions of) one or both of classified data storage 150 and classification dependant storage processing block 160.

At 620 of flow diagram 600, in one embodiment, the method processes the received classified data within the storage system for storage within the storage system in accordance with a data deduplication storage methodology. The data deduplication storage methodology is one of a plurality of predefined data deduplication storage methodologies that is associated with the deduplication classification into which the classified data is classified. In one embodiment, this comprises classification dependant storage processing block 160 processing the classified data for storage within data storage system 130 or 430. This can comprise processing the classified data using a variable storage methodology storage processor 261 that switches between deduplication storage methodologies depending on the deduplication storage methodology associated with a class of data being processed. This can also comprise processing the classified data using a single methodology storage processor 362 (e.g., single methodology storage processor 362-1) that is dedicated to processing classified data according to a particular deduplication storage methodology associated with a class, of a plurality of data classes.

Consider an embodiment where the classified data is in a class that is associated with a whole file deduplication storage methodology. In such an embodiment, classification dependant storage processing block 160 processes such classified data based upon this classification and deduplicates the classified data with a whole file deduplicator that may be a variable methodology storage processor 261 (as shown in FIG. 2) operated in this fashion or a single methodology storage processor 362 (as shown in FIG. 3) that operates only in this fashion.

Consider an embodiment where the classified data is in a class that is associated with a sub-file blocklet level deduplication storage methodology. In such an embodiment, classification dependant storage processing block 160 processes such classified data based upon this classification and deduplicates the classified data with a sub-file blocklet level deduplicator that may be a variable methodology storage processor 261 (as shown in FIG. 2) operated in this fashion or a single methodology storage processor 362 (as shown in FIG. 3) that operates only in this fashion.

Consider an embodiment where the classified data is in a class that is associated with a deduplication storage methodology that involves storage without deduplication processing. In such an embodiment, classification dependant storage processing block 160 processes such classified data based upon this classification and outputs the classified data for intact storage without any indexing of the classified data in a deduplication block pool. This can comprise bypassing a deduplication storage processor or passing the classified data through a variable methodology storage processor 261 (as shown in FIG. 2) or a single methodology storage processor 362 (as shown in FIG. 3) without processing the data for deduplication. In one embodiment, such processing gives the ability to bypass deduplication processing for a file that has been identified (and appropriately classified) as data needing faster read performance when read back from a data storage system (130, 430) or to bypass deduplication processing on a file that has been determined as not amenable to efficient deduplication.

At 630 of flow diagram 600, in one embodiment, the method stores within the data storage system the processed information output from processing the classified data for storage. In one embodiment, this comprises classification dependant storage processing block 160 outputting processed information (such as blocklets, or whole files) for storage in a repository 170 of data storage system 130 or 430. It is appreciated that a different repository 170 (of repositories 170-1 to 170-*n*) can be used for storage of information processed according to each of a plurality of different deduplication storage methodologies employed by classification dependant storage processing block 160 for processing classified data. In one embodiment, for example, a repository 170 comprises a blockpool that is used for storing unique data blocks (including whole files), blocklets, or entire unprocessed files, in accordance with a particular deduplication storage methodology with which a repository is associated.

Example Computer System Environment

FIG. 7 illustrates an example computer system 700, according to an embodiment, with which or upon which various embodiments of the present invention can be implemented. All or portions of some embodiments described herein are composed of computer-readable and computer-executable instructions that reside, for example, in computer-usable/computer-readable storage media of, or useable by, a computer system. That is, FIG. 7 illustrates one example of a type of computer (computer system 700) that can be used in accordance with, or to implement various embodiments, that are discussed herein. It is appreciated that computer system 700 of FIG. 7 is only an example and that embodiments as described herein can operate on or within a number of different computer systems including, but not limited to, general purpose networked computer systems, embedded computer systems, server devices, client devices, various intermediate devices/nodes, stand alone computer systems, storage systems, and the like. As shown in FIG. 7, computer system 700 of FIG. 7 is well adapted to having peripheral computer-readable storage media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multiprocessor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM), coupled to bus 704 for storing information and instructions for processors 706A, 706B, and 706C. System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. In one embodiment, system 700 also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands. System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable media within data storage unit 712, peripheral computer-readable media 702, and/or other computer-readable storage media.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable storage medium storing computer-executable instructions that when executed by a computer cause the computer to perform a method, the method comprising:
   accessing data to be classified;
   classifying the data into a deduplication classification based, at least in part, on a classification policy where the classification policy explicitly indicates at least a blocklet size for the data, where classifying the data into a deduplication classification based, at least in part, on the classification policy includes classifying the data based, at least in part, on an access requirement associated with the data;
   controlling a processor to selectively perform a whole file deduplication methodology on an item upon determining that the deduplication classification associated with the item is a whole file deduplication policy; and
   controlling the processor to perform a sub-file blocklet level deduplication methodology on the item upon determining that the deduplication classification associated with the item is a sub-file blocklet level deduplication policy, where the sub-file blocklet level deduplication methodology is controlled, at least in part, by the deduplication classification associated with the item, where the item comprises a file or a data stream, and where the different deduplication methodologies deduplicate with respect to average blocklet size, minimum blocklet size, or maximum blocklet size as controlled by the deduplication classification.

2. The non-transitory computer-readable storage medium of claim 1, where accessing data to be classified comprises receiving the data in the form of a file or the form of a data stream.

3. The non-transitory computer-readable storage medium of claim 1, where classifying the data includes assigning the data to a data deduplication methodology of a plurality of predefined different data deduplication methodologies preassociated with different deduplication classifications, where the plurality of predefined different data deduplication methodologies are configured to selectively perform deduplication using different blocklet sizes for different items, where the different blocklet sizes for the different items are selected based, at least in part, on the deduplication classification associated with the item.

4. The non-transitory computer-readable storage medium of claim 3, where classifying the data includes directing the data to be processed and stored in a storage medium associated with an assigned deduplication classification.

5. The non-transitory computer-readable storage medium of claim 3, where classifying the data includes storing the data for future processing in accordance with the deduplication classification.

6. A system, comprising:
   a receiver comprising a hardware processor that receives data that has been classified into a deduplication classification in accordance with a classification policy, where the classification policy includes a plurality of different deduplication classifications for indicating different deduplicating methodologies for different types of data, where the different deduplicating methodologies perform deduplication using different block sizes, where the different block sizes are based, at least in part, on the classification policy; and a storage processing block comprising a hardware processor that processes the data according to a predefined data deduplication methodology associated with the deduplication classification.

7. The system of claim 6, comprising:
a plurality of repositories that separately store data associated with different deduplication classifications.

8. The system of claim 6, where the different deduplicating methodologies deduplicate with respect to average blocklet size, minimum blocklet size, or maximum blocklet size as controlled by a deduplication classification.

9. A non-transitory computer-readable medium storing computer executable instructions that when executed by a computer cause the computer to perform a method, the method comprising:
classifying the data into a deduplication class from the plurality of deduplication classes based, at least in part, on a classification policy, where the classification policy correlates data to a deduplication class based, at least in part, on a content type of the data, and an access requirement of the data, where the access requirement indicates a quality of service associated with the data;

receiving data that is classified into a deduplication class of a plurality of deduplication classes, where the plurality of deduplication classes identify different granularity of sub-file blocklet size when performing deduplication; and deduplicating the data based, at least in part, on a granularity of sub-file blocklet size for the deduplication class of the data.

10. The non-transitory computer-readable medium of claim 9, where the data is stored in a storage medium for data of the deduplication class of the plurality of deduplication classes and data of a second deduplication class of the plurality of deduplication classes is stored in a second storage medium.

11. The non-transitory computer-readable medium of claim 9, where deduplicating the data based, at least in part, on the granularity of sub-file blocklet size for the deduplication class of the data comprises directing the data to one of a plurality of different sub-file blocklet level deduplicators associated with the deduplication class.

* * * * *